(12) United States Patent
MacCarthy

(10) Patent No.: US 7,548,803 B2
(45) Date of Patent: Jun. 16, 2009

(54) VEHICLE SURVEILLANCE AND CONTROL SYSTEM

(76) Inventor: James MacCarthy, 114 Oak St., Apt. B, Maybrook, NY (US) 12543

( * ) Notice: Subject to any disclaimer, the term of this patent is extended or adjusted under 35 U.S.C. 154(b) by 536 days.

(21) Appl. No.: 10/979,938

(22) Filed: Nov. 1, 2004

(65) Prior Publication Data
US 2006/0170770 A1 Aug. 3, 2006

Related U.S. Application Data

(60) Provisional application No. 60/538,034, filed on Jan. 21, 2004.

(51) Int. Cl.
*G06F 7/00* (2006.01)
(52) U.S. Cl. ............... 701/36; 701/1; 340/426.1; 340/5.83; 307/10.5; 348/151
(58) Field of Classification Search ......... 348/151, 348/118, 937, 153, 159; 701/1, 36; 382/104, 382/118, 115; 340/541, 397, 426.18, 426.22, 340/426.24, 426.28, 5.83, 426; 307/10.5
See application file for complete search history.

(56) References Cited

U.S. PATENT DOCUMENTS 4,326,218 A * 4/1982 Coutta et al. ............... 348/150

(Continued)

FOREIGN PATENT DOCUMENTS

AU 8317655 A * 2/1984

(Continued)

OTHER PUBLICATIONS

Radar image acquisition and interpretation for automotive applications, Meis, U.; Schneider, R.; Intelligent Vehicles Symposium, 2003. Proceedings. IEEE, Jun. 9-11, 2003 pp. 328-332, Digital Object Identifier 10.1109/IVS.2003.1212931.*

(Continued)

*Primary Examiner*—Cuong H Nguyen
(74) *Attorney, Agent, or Firm*—Raymond M. Galasso; Galasso & Associates, L.P.

(57) ABSTRACT

A vehicle surveillance and control system is provided which has a camera for creating video data and a transmitter coupled to the camera for transmitting the video data to a receiver. The surveillance system can also have a microphone for providing audio data for transmission. The receiver is then coupled to a recorder and possibly a monitor. If the operator of the vehicle is not authorized to operate the vehicle (a thief) or to perform an activity (operation of the vehicle recklessly or while intoxicated) then the activities of the operator can be recorded or monitored and the data can be utilized to convict, penalize, or fine an individual or to implement remote control of the vehicle. The camera can also monitor activity outside the vehicle such as a hit and run, a parking lot impact or theft of a tire. In one embodiment, the receiver can be coupled to a monitor and the video data can be viewed in real-time. The system can also include an Input/Output module and a vehicle system control module, wherein the Input/Output module can receive and display video and send a control signal having an identification code to the vehicle system control module wherein the vehicle system control module can control the operation of a vehicle system such as the ignition system or the fuel system thereby stopping dangerous operation of the vehicle and reducing potential economic losses and loss of life.

11 Claims, 2 Drawing Sheets

U.S. PATENT DOCUMENTS

| | | | |
|---|---|---|---|
| 4,510,526 A * | 4/1985 | Coutta et al. | 348/143 |
| 4,514,068 A * | 4/1985 | Urquhart | 396/427 |
| 4,638,294 A | 1/1987 | Sakurai | |
| 4,856,072 A | 8/1989 | Schneider et al. | |
| 4,963,962 A * | 10/1990 | Kruegle et al. | 348/151 |
| 5,027,104 A * | 6/1991 | Reid | 340/541 |
| 5,117,505 A * | 5/1992 | Talwar | 455/278.1 |
| 5,878,283 A * | 3/1999 | House et al. | 396/6 |
| 5,886,738 A * | 3/1999 | Hollenbeck et al. | 348/151 |
| 6,118,474 A * | 9/2000 | Nayar | 348/36 |
| 6,151,065 A * | 11/2000 | Steed et al. | 348/148 |
| 6,211,907 B1 * | 4/2001 | Scaman et al. | 348/148 |
| 6,400,835 B1 * | 6/2002 | Lemelson et al. | 382/118 |
| 6,462,775 B1 * | 10/2002 | Loyd et al. | 348/151 |
| 6,624,845 B2 * | 9/2003 | Loyd et al. | 348/151 |
| 6,717,518 B1 * | 4/2004 | Pirim et al. | 340/576 |
| 6,813,554 B1 * | 11/2004 | Ebert | 701/117 |
| 6,831,993 B2 * | 12/2004 | Lemelson et al. | 382/118 |
| 7,116,803 B2 * | 10/2006 | Lemelson et al. | 382/118 |
| 2002/0057915 A1 * | 5/2002 | Mann | 396/661 |
| 2002/0154218 A1 * | 10/2002 | Loyd et al. | 348/151 |
| 2003/0002165 A1 * | 1/2003 | Mathias et al. | 359/630 |
| 2003/0142849 A1 * | 7/2003 | Lemelson et al. | 382/104 |
| 2004/0252993 A1 * | 12/2004 | Sato | 396/661 |
| 2006/0170770 A1 * | 8/2006 | MacCarthy | 348/148 |
| 2007/0053551 A1 * | 3/2007 | Kubo et al. | 382/106 |
| 2008/0198228 A1 * | 8/2008 | Rizk | 348/148 |

FOREIGN PATENT DOCUMENTS

| | | | |
|---|---|---|---|
| CN | 1601568 A * | 3/2005 | |
| CN | 1928494 A * | 3/2007 | |
| CN | 201133901 Y * | 10/2008 | |
| DE | 3624486 A * | 1/1988 | |
| DE | 4402775 C1 * | 7/1995 | |
| DE | 20311529 U1 * | 10/2003 | |
| EP | 254192 A * | 1/1988 | |
| EP | 1120313 A2 * | 8/2001 | |
| GB | 2287152 A * | 9/1995 | |
| HU | 200300111 A1 * | 8/2004 | |
| JP | 2000215393 A * | 8/2000 | |
| JP | 3389378 B2 * | 3/2003 | |
| JP | 2006193057 A * | 7/2006 | |
| JP | 2006193070 A * | 7/2006 | |
| JP | 2006279752 A * | 10/2006 | |
| JP | 2007045209 A * | 2/2007 | |
| JP | 2007222203 A * | 9/2007 | |
| JP | 2007271956 A * | 10/2007 | |

OTHER PUBLICATIONS

Three-dimensional surface reconstruction and panoramic optical mapping of large hearts, Kay, M.W.; Amison, P.M.; Rogers, J.M.; Biomedical Engineering, IEEE Transactions on, vol. 51, Issue 7, Jul. 2004 pp. 1219-1229 , Digital Object Identifier 10.1109/TBME.2004.827261.*

A Centralized Omnidirectional Multi-Camera System with Peripherally-Guided Active Vision and Depth Perception, Jankovic, Nicholas D.; Naish, Michael D.; Networking, Sensing and Control, 2007 IEEE International Conference on , Apr. 15-17, 2007 pp. 662-667, Digital Object Identifier 10.1109/ICNSC.2007.372858.*

Why I want a gradient camera, Tumblin, J.; Agrawal, A., Raskar, R.; Computer Vision and Pattern Recognition, 2005. CVPR 2005. IEEE Computer Society Conference on, vol. 1, Jun. 20-25, 2005 pp. 103-110 vol. 1, Digital Object Identifier 10.1109/CVPR.2005.374.*

Mirroring Medusa: counterveillance in Shooting Back, Jieun Rhee; Information Visualization, 1999. Proceedings. 1999 IEEE International Conference on, Jul. 14-16, 1999 pp. 408-412, Digital Object Identifier 10.1109/IV.1999.781589.*

Armstrong, Larry, Holyoke, Larry, "NASA's Tiny Camera Has A Wide-Angle Future", Business Week, Mar. 6, 1995, pp. 54-55. cited by other.*

Atick, Joseph J., Griffin, Paul A., Redlich A. Norman, "Face Recognition From Live Video For Real-World Applications—Now", Available on Internet at http://venezia.Rockefeller.edu (1996). cited by other.*

Hong, Lin; Jain, Anil. "Integrating Faces and Fingerprints for Personal Identification", IEEE Transactions on Pattern Analysis and Machine Intelligence, Dec. 1998, pp. 1295-1307. cited by other.*

Brunelli, Roberto; Falavigna, Daniele. "Person Identification Using Multiple Cues", IEEE Transactions on Pattern Analysis and Machine Intelligence, Oct. 1995, pp. 955-966. cited by other.*

New Automotive Sensors-A Review; Fleming, W. J.; Sensors Journal, IEEE; vol. 8, Issue 11, Nov. 2008 pp. 1900-1921; Digital Object Identifier 10.1109/JSEN.2008.2006452.*

Design of an instrumented vehicle test bed for developing a human centered driver support system; McCall, J.C.; Achler, O.; Trivedi, M.M.; Intelligent Vehicles Symposium, 2004 IEEE; Jun. 14-17, 2004 pp. 483-488; Digital Object Identifier 10.1109/IVS.2004.1336431.*

Radar image acquisition and interpretation for automotive applications; Meis, U.; Schneider, R.; Intelligent Vehicles Symposium, 2003. Proceedings. IEEE; Jun. 9-11, 2003 pp. 328-332; Digital Object Identifier 10.1109/IVS.2003.1212931.*

* cited by examiner

VEHICLE SURVEILLANCE AND CONTROL SYSTEM

CROSS REFERENCE TO A RELATED APPLICATION

The present application claims priority to U.S. Provisional Patent Application Ser. No. 60/538,034 entitled "Video Thief" filed on Jan. $21^{st}$ 2004.

TECHNICAL FIELD

The present invention relates in general to a visual surveillance and control system and more particularly to a visual surveillance system for monitoring human activities and restricting a human's ability to cause vehicular damages.

BACKGROUND OF THE INVENTION

Trucks, automobiles, motorcycles, boats or any motorized apparatus, collectively referred to herein as vehicles, are a significant component of the American society. Billions of dollars are spent insuring vehicles, fixing vehicles and on damages caused by vehicles. Vehicles are a major cause of property damage and personal injury. Millions of additional dollars are spent on vehicle theft and theft of vehicle parts. When a vehicle is stolen or "car jacked" personal property and human lives are often at stake and loss of life can result. During a high-speed chase law enforcement officials are often at the mercy of the criminal and have to risk their life in order to protect citizens from death. Drunk driving is another act that carries a high social cost. Additionally, when drivers are not the owners of the vehicle, the business that own the vehicle can incur a significant financial risk when an operator behaves badly. A rental company such as U-Haul™, Avis™ or a boat rental company can incur significant costs if a renter drives inebriated or recklessly and causes damages. When vehicle renters seriously abuse a vehicle, the rental company can also be economically damaged. In the trucking industry millions of dollars are spent on safety and insurance by companies who own their own trucks. Accident investigators and insurance companies would benefit from being able to determine what happened prior to an accident or theft. The present disclosure is directed at identifying undesirable human activity and providing solutions for controlling or restricting undesirable vehicular related activities.

SUMMARY OF THE INVENTION

A vehicle surveillance and control system is provided which has a camera for creating video data and a transmitter coupled to the camera for transmitting the video data to a receiver. The surveillance system can also have a microphone for providing audio data for transmission. The receiver is then coupled to a recorder and possibly a monitor. If the operator of the vehicle is not authorized to operate the vehicle (a thief) or to perform an activity (operation of the vehicle recklessly or while intoxicated) then the activities of the operator can be recorded or monitored and the data can be utilized to convict, penalize, or fine an individual or to implement remote control of the vehicle. The camera can also monitor activity outside the vehicle such as a hit and run, a parking lot impact or theft of a tire. In one embodiment, the receiver can be coupled to a monitor and the video data can be viewed in real-time. The system can also include an Input/Output module and a vehicle system control module, wherein the Input/Output module can receive and display video and send a control signal having an identification code to the vehicle system control module wherein the vehicle system control module can control the operation of a vehicle system such as the ignition system or the fuel system thereby stopping dangerous operation of the vehicle and reducing potential economic losses and loss of life.

BRIEF DESCRIPTION OF THE DRAWINGS

The novel features believed characteristic of the disclosure are set forth in the appended claims. The disclosure itself however, as well as the preferred mode of use, and advantages thereof will best be understood by reference to the following detailed description of an illustrative embodiment when read in conjunction with the accompanying drawings, wherein:

DETAILED DESCRIPTION OF ILLUSTRATIVE EMBODIMENT

Figure 1:
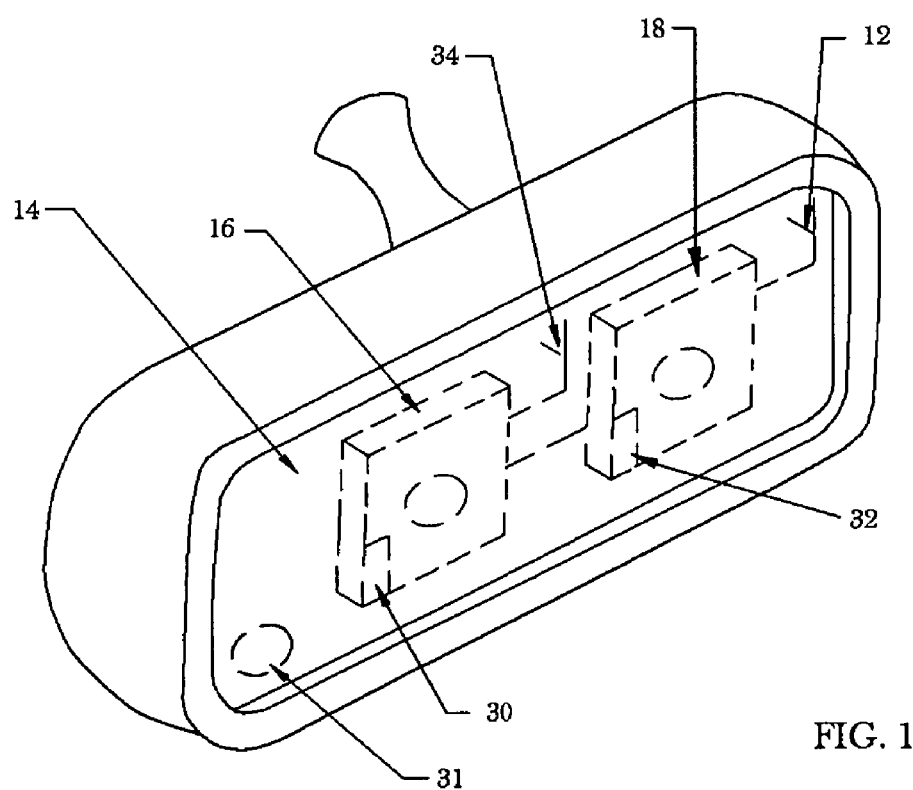
FIG. 1 Illustrates a rear view mirror according to one embodiment of the present invention.

With reference now to the figures and in particular with reference to FIG. 1, a rear view mirror assembly in accordance with the present disclosure is depicted. Rear view mirror assembly 10 has a housing 12, which is coupled to reflective surface 14 and first camera 16 (illustrated between reflective surface 14 and housing 12), and a second camera 18 (also illustrated between reflective surface 14 and housing 12). A reflective surface, which allows viewing from one direction, is often called a 1-way mirror. A one-way mirror could be utilized in cooperation with the cameras. First camera 16 and second camera 18 can produce still photos or they can produce streaming video. First camera 16 and second camera 18 can utilize wireless communication or they can be hard wired together with other components of the system. In one embodiment first camera 16 and second camera 18 have wide-angle lenses. First camera 16 can point towards the rear of the vehicle and can provide coverage for the entire cockpit and the rear of the vehicle. Second camera 18 can point towards the front of the vehicle and can provide coverage for activities, which occur in front of the vehicle. If maximum resolution is desired then additional cameras can be installed in mirror housing 10 (additional cameras are not shown) each having a narrower viewing angle.

Although the shape of rear view mirror assembly 10 in FIG. 1 has the shape of an interior rear view mirror it could also take the shape and function of an external rear view mirror. Thus a system utilizing one interior and two exterior rear view mirrors could have six cameras covering four side quadrants of the vehicle and the front and the back center region.

Figure 2:
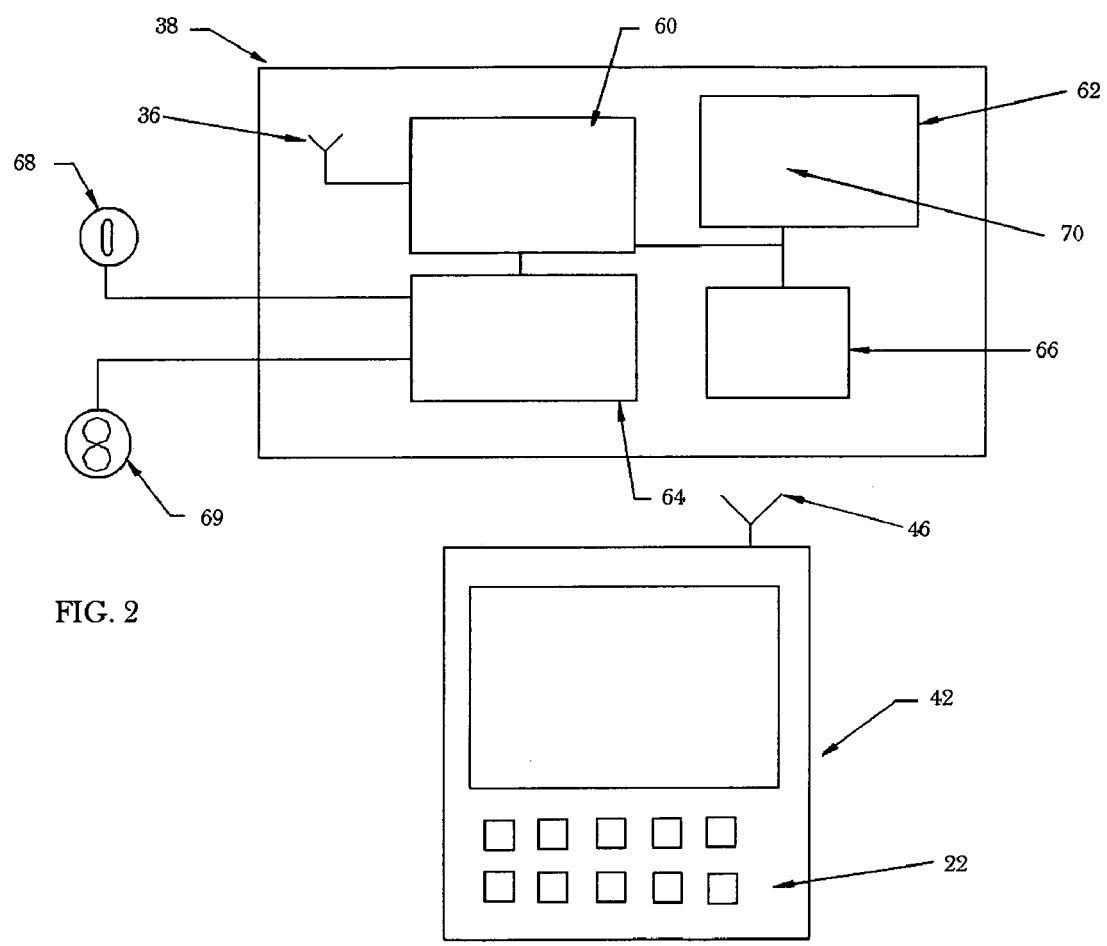
FIG. 2 depicts a vehicle video surveillance and control system in accordance with another embodiment of the present invention.

Referring now to FIG. 2 an embodiment of a vehicle surveillance system is depicted in accordance with the present disclosure. Although not specifically illustrated, all components depicted in FIG. 2 except for Input/Output module 42 can be physically mounted to a vehicle and wired utilizing standard wiring procedures. Referring briefly back to FIG. 1, video data created by first camera 18 and second camera 16 or any camera in the system can be transferred to receiver/transmitter 30. For example, first camera 16 can be coupled to first receiver/transmitter 30 and first receiver/transmitter 30 can be coupled to first antenna 34. In other embodiment one transmitter could be utilized for both cameras. Video data can be transmitted from first antenna 34 to second antenna 36 in FIG. 2. Second antenna 36 can be coupled to central receiver-transmitter 60. Central receiver-transmitter 60 can be coupled to recorder 62. Components of central module 38 can be mounted to the vehicle or they can be located remotely from the vehicle (not shown) such as in a cellular telephone network. I/O (input/output) device 42 can be coupled to fourth antennae 46 and can communicate with central receiver transmitter 60 via wireless communication network, a hardwired network or any combination thereof. Vehicle system controller 64 can be coupled to second antennae 36 and can receive instructions from I/O module 42 or from activation sensor 66. I/O module 42 has input switches 22 to receive user input. Responsive to the instructions, vehicle system controller 64 can send a signal to an ignition system 68 or a fuel system 69 to instruct such systems to modify operation. Numerous other methods for controlling or disabling the vehicle could be utilized without parting from the scope of this disclosure. It is desirable that the vehicle not be entirely disabled because this could reduce steering and braking control. In specific instances commanding the motor to shut down entirely would be desirable. During a high-speed chase commands from the I/O device 42 can entirely disable the vehicle to reduce potential dangers to others.

Activation sensor 66 can be utilized to activate components such as the cameras, the receiver transmitters and the recorder. Activation sensor 66 may sense if someone has bumped the vehicle or someone is sitting in the drivers seat. I/O module 42 could also be utilized to activate the surveillance and control system. Although the system is described with multiple components in the central module 38 these components could be discretely or remotely mounted without parting from the scope of the present invention.

Vehicle system controller 64 can be assigned an identification code 70. The identification code 70 can be stored by recorder 62 and when a transmission from I/O device 42 is received by controller 64, controller 64 can process the incoming signal compare it to its assigned identification code 70 to determine if the transmission is intended for controller 64. The identification code 70 can be linked in a relational database (not shown) to the Vehicle Identification Number (VIN) of the vehicle. (The VIN is a code, which the manufacturer assigns to the vehicle at the factory.) The government often has records, which can relate a VIN number to an issued license plate number. Peace officers typically have access to this information via a dispatcher. Thus, a relational database can be created which links a license plate number to the identification code 70 of the system controller 64 on board the vehicle and authorities can selectively control a vehicle, which has the present system on board.

In the event of a theft or high speed chase the behavior of the operator can be viewed and, if the officer can obtain the license plate of the vehicle then, using an I/O device 42 the officer can transmit a signal having a controller identification code 70 to a specific controller 64 and in response to the transmission, the controller 64 can disable or control the vehicle. The central module 38 can also contain recorder/memory 62 to record video and audio 31 information.

In one embodiment cellular telephone functions are incorporated into the central module 38. Cellular telephone towers (not shown) can provide multiple I/O receivers. In this embodiment video can be available over the Internet to the owner of the vehicle or a local police department. Using an input/output device 42 an authorized controller can receive data then send a signal via the Internet and a cell telephone network to the vehicle system controller 64. The disclosure relates to a surveillance system, which can be utilized to produce video data such that human activities proximate to an automobile can be identified, monitored and possibly restricted.

What is claimed is:

1. The vehicle surveillance system comprising:
    a vehicular mirror assembly having a reflective surface;
    at least one camera concealed behind the reflective surface; said camera having a wide range lens and operable to provide coverage of the entire cockpit and rear of the vehicle;
    at least one camera concealed within the vehicular mirror assembly; said camera comprising a wide range lens and operable to provide coverage of the front of the vehicle;
    a transmitter coupled to the camera for transmitting video data;
    a storage device for storing the video data, wherein activities proximate to the vehicle can be stored.

2. The vehicle surveillance system as in claim 1, wherein said system is coupled to an ignition system.

3. The vehicle surveillance system as in claim 2, further including a microphone for providing audio data.

4. The vehicle surveillance system as in claim 1, further including
    a first receiver for receiving data; and
    a monitor for displaying the received data such that the activities proximate to the vehicle can be remotely monitored.

5. The vehicle surveillance system as in claim 1, further including:
    an input/output device for transmitting a control signal;
    a second receiver for receiving said control signal; and
    a vehicle system controller coupled to said second receiver and a system of said vehicle wherein a control signal from the input/output device can restrict performance of said vehicle.

6. The vehicle surveillance system as in claim 1, further including a sensor for activating the surveillance and control system.

7. The vehicle surveillance system as in claim 1 further including a microphone for producing audio data.

8. The vehicle surveillance system as in claim 1 wherein the transmitter is wireless.

9. The vehicle surveillance system as in claim 1, wherein the at least one camera is located in the interior rear view mirror.

10. The vehicle surveillance system as in claim 1, wherein said system controller is coupled to a fuel system.

11. The vehicle surveillance system as in claim 5, further including
    an identification code assignable to the vehicle system controller; and
    a relational database for relating a license plate identifier to a vehicle system controller such that the input/output device con disable a selectable vehicle responsive to the human activity and the license plate identifier.

* * * * *